(12) United States Patent
Yu et al.

(10) Patent No.: US 9,860,831 B2
(45) Date of Patent: Jan. 2, 2018

(54) TERMINAL AND METHOD FOR IDLE HANDOFF BASED ON HIGH RATE PACKET DATA SYSTEM

(75) Inventors: Yuanfang Yu, Guangdong Province (CN); Ting Lu, Guangdong Province (CN)

(73) Assignee: XI'AN ZHONGXING NEW SOFTWARE CO., LTD., Xi'An, Shaanxi (CN)

(*) Notice: Subject to any disclaimer, the term of this patent is extended or adjusted under 35 U.S.C. 154(b) by 1069 days.

(21) Appl. No.: 13/391,090

(22) PCT Filed: May 25, 2010

(86) PCT No.: PCT/CN2010/073205
§ 371 (c)(1),
(2), (4) Date: Feb. 17, 2012

(87) PCT Pub. No.: WO2010/145420
PCT Pub. Date: Dec. 23, 2010

(65) Prior Publication Data
US 2012/0172034 A1    Jul. 5, 2012

(30) Foreign Application Priority Data

Sep. 23, 2009 (CN) .......................... 2009 1 0178105
Oct. 23, 2009 (CN) .......................... 2009 1 0207116

(51) Int. Cl.
*H04W 48/18* (2009.01)
*H04W 28/06* (2009.01)
(Continued)

(52) U.S. Cl.
CPC ............ *H04W 48/18* (2013.01); *H04W 28/06* (2013.01); *H04W 28/18* (2013.01); *H04W 76/048* (2013.01)

(58) Field of Classification Search
CPC combination set(s) only.
See application file for complete search history.

(56) References Cited

U.S. PATENT DOCUMENTS 8,514,778 B1 * 8/2013 Fang ................... H04W 4/06
370/328
9,049,096 B2 * 6/2015 Babbar .................. H04L 45/00
(Continued)

FOREIGN PATENT DOCUMENTS

| CN | 1867167 A | 11/2006 |
|---|---|---|
| CN | 101321382 A | 12/2008 |
| CN | 101523953 A | 9/2009 |

OTHER PUBLICATIONS

"Interoperability Specification (IOS) for Evolved High Rate Packet Data (eHRPD) Radio Access Network Interfaces and Interworking with Enhanced Universal Terrestrial Radio Access Network (E-UTRAN); 3GPP2 A.S0022-0 v1.0".

(Continued)

*Primary Examiner* — Steven Kelley
(74) *Attorney, Agent, or Firm* — Ling Wu; Stephen Yang; Ling and Yang Intellectual Property

(57) ABSTRACT

The present invention provides a terminal and method for an idle handoff based on a High Rate Packet Data (HRPD) system. The method includes, when the terminal switches from the HRPD system to a non-HRPD radio access technology system, an HRPD protocol stack of the terminal migrating from a non-tunnel state to a tunnel state. When the terminal is in a handoff area, and performs the idle handoff from the HRPD system to the non-HRPD radio access technology system, the terminal after the handoff is in the tunnel state, and the HRPD session information of the terminal is reserved. Thus, when the terminal switches back to the HRPD system, it is not necessary to perform the HRPD session negotiation again, thereby effectively avoid- (Continued)

ing the waste of air interface resources and system processing capabilities, and improving efficiency of interconnection and intercommunication between the HRPD system and other radio access technology system.

8 Claims, 7 Drawing Sheets

(51) Int. Cl.
*H04W 28/18* (2009.01)
*H04W 76/04* (2009.01)

(56) References Cited

U.S. PATENT DOCUMENTS

| | | | | |
|---|---|---|---|---|
| 2002/0159439 | A1* | 10/2002 | Marsh et al. | 370/352 |
| 2005/0020203 | A1* | 1/2005 | Losh et al. | 455/11.1 |
| 2006/0239227 | A1 | 10/2006 | Han et al. | |
| 2007/0021120 | A1* | 1/2007 | Flore et al. | 455/436 |
| 2007/0280264 | A1* | 12/2007 | Milton | H04W 36/0022 |
| | | | | 370/395.31 |
| 2008/0305772 | A1* | 12/2008 | Balasubramanian et al. | 455/411 |
| 2009/0042576 | A1* | 2/2009 | Mukherjee et al. | 455/436 |
| 2009/0073933 | A1* | 3/2009 | Madour et al. | 370/331 |
| 2010/0056150 | A1* | 3/2010 | Mooney et al. | 455/436 |
| 2011/0013598 | A1* | 1/2011 | Jang et al. | 370/331 |
| 2011/0064054 | A1* | 3/2011 | Parsons et al. | 370/331 |
| 2011/0274089 | A1* | 11/2011 | Yu | H04W 36/0011 |
| | | | | 370/331 |

OTHER PUBLICATIONS

Liu, Dongming et al.cdma2000 High Rate Packet Data-HRPD, Telecommunications Network Technology.
3rd Generation Partnership Project; Technical Specification Group Services and System Aspects;Architecture enhancements for non-3GPP accesses(Release 9) 3GPP TS 23.402 V9.1.0.
International Search Report for PCT/CN2010/073205 dated Aug. 3, 2010.

\* cited by examiner

```
┌─────────────────────────────────────────────────────────────────┐
│ The terminal in idle state switches from the HRPD system to a  │ ─── 201
│ non-HRPD radio access technology system, the tunnel enabling   │
│ parameter is set as a state of tunnel being enabled, the        │
│ overhead parameter update identifier is set as a state of no    │
│ update, and the HRPD protocol stack of the terminal migrates    │
│ from the non-tunnel state to the tunnel state                   │
└─────────────────────────────────────────────────────────────────┘
                                  │
                                  ▼
┌─────────────────────────────────────────────────────────────────┐
│         The terminal reserves the HRPD session information      │ ─── 202
└─────────────────────────────────────────────────────────────────┘
                                  │
                                  ▼
┌─────────────────────────────────────────────────────────────────┐
│ The terminal removes all the neighbour information and executes │
│ the parameter update operation of neighbour set searching       │ ─── 203
│ window, stops using the parameter designated in the property    │
│ override message, and begins to use the parameter value         │
│ designated by a same channel parameter set management property  │
│ or a different channel parameter set management property        │
└─────────────────────────────────────────────────────────────────┘
                                  │
                                  ▼
┌─────────────────────────────────────────────────────────────────┐
│ The idle state protocol module supporting the inter-radio       │ ─── 204
│ access technology interoperation instructs that the control     │
│ channel MAC protocol module switches from the activated state   │
│ to the unactivated state                                        │
└─────────────────────────────────────────────────────────────────┘
                                  │
                                  ▼
┌─────────────────────────────────────────────────────────────────┐
│ The routing update protocol module supporting the inter-radio   │ ─── 205
│ access technology interoperation instructs that the access      │
│ channel MAC protocol module switches from the activated state   │
│ to the unactivated state                                        │
└─────────────────────────────────────────────────────────────────┘
```

FIG. 2

TERMINAL AND METHOD FOR IDLE HANDOFF BASED ON HIGH RATE PACKET DATA SYSTEM

TECHNICAL FIELD

The present invention relates to communication field, and particularly, to a terminal and method for an idle handoff based on a High Rate Packet Data (HRPD) system.

BACKGROUND OF THE RELATED ART

In subsequent evolution of Code Division Multiple Access (CDMA) network, the interoperation between the CDMA network and Long Term Evolution (LTE) network is one tendency of network development. It is not a simple replacement procedure that the already commercial CDMA network evolves to the LTE network, but the networks have a long period of coexistence. During this period of coexistence, the interconnection and intercommunication of two wireless networks are essential.

One of the requirements of the high rate packet data (HRPD)—LTE interoperation is to support idle handoff of the access terminal from the HRPD to the LTE. In order to support the interoperation between the HRPD and LTE system, a series of protocol processes are defined in the HRPD system, however, in the existing-implementation, specific operation that the access terminal performs the idle handoff from the HRPD to the LTE is not definite, which may cause these protocol processing modules to be unable to work and effectively support the interoperation between the HRPD and the LTE.

CONTENT OF THE INVENTION

The technical problem to be solved by the present invention is to provide a terminal and a method for an idle handoff based on an HRPD system, which can make the terminal in idle state be in a tunnel state after switching, so that signals of the HRPD system no longer needs to be monitored and session information of the HRPD of the terminal will be reserved, thereby effectively avoiding the waste of air interface resources and system processing ability.

In order to solve the above problem, the present invention provides a method for an idle handoff based on a High Rate Packet Data (HRPD) system, comprising: when a terminal switches from the HRPD system to a non-HRPD radio access technology system, an HRPD protocol stack of the terminal migrating from a non-tunnel state to a tunnel state.

The HRPD protocol stack comprises one or more of the following modules:
an inter-radio access technology idle state protocol module and an inter-radio access technology routing update protocol module.

The step of the HRPD protocol stack migrating from the non-tunnel state to the tunnel state comprises:
when the HRPD protocol stack comprises the inter-radio access technology idle state protocol module, the inter-radio access technology idle state protocol module migrating from a monitor state or a sleep state to the tunnel state;
when the HRPD protocol stack comprises an inter-radio access technology routing update protocol module, the inter-radio access technology routing update protocol module migrating from an idle state to the tunnel state.

The HRPD protocol stack comprises an inter-radio access technology overhead message protocol module;
the step of the HRPD protocol stack migrating from the non-tunnel state to the tunnel state comprises: when the HRPD protocol stack comprises the inter-radio access technology overhead message protocol module, the inter-radio access technology overhead message protocol module migrating from an activated state or an unactivated state to a tunnel activated state.

The terminal reserves HRPD session information.

The terminal sends a session maintaining activation message to an access network, sets a timer locally, and the terminal starts up the timer when sending the session maintaining activation message;
if a response message returned by the access network has not been received when the timer is time out, clears the HRPD session information and initializes the HRPD protocol stack.

The HRPD protocol stack further comprises a control channel media access control protocol module;
when the HRPD protocol stack comprises the inter-radio access technology idle state protocol module, after the step of the inter-radio access technology idle state protocol module migrating to the tunnel state, the method further comprises:
sending a deactivation command to the control channel media access control protocol module;
the control channel media access control protocol module, after receiving the deactivation command, migrating from an activated state to an unactivated state.

The HRPD protocol stack further comprises an access channel media access control protocol module;
when the HRPD protocol stack includes the inter-radio access technology routing update protocol module, after the step of the inter-radio access technology routing update protocol module migrating to the tunnel state, the method further comprises:
sending a deactivation command to the access channel media access control protocol module;
the access channel media access control protocol module, after receiving the deactivation command, migrating from an activated state to an unactivated state.

The terminal sets a tunnel enabling parameter as a state of tunnel being used, and sets an overhead parameter update identifier as a state of no update.

The terminal removes all the neighbor information and executes a parameter update operation of neighbor set searching window, stops using a parameter designated in a property override message, and begins to use a parameter value designated by a same channel parameter set management property or a different channel parameter set management property.

The HRPD protocol stack further comprises a control channel media access control protocol module and an overhead message protocol module;
after the step of the inter-radio access technology idle state protocol module migrating to the tunnel state, the method further comprises:
sending a deactivation command to the control channel media access control protocol module, and sending a tunnel activation command to the overhead message protocol module;
the control channel media access control protocol module, after receiving the deactivation command, migrating from an activated state to an unactivated state; and
the overhead message protocol module, after receiving the tunnel activation command, migrating from the activated state to the tunnel state.

The present invention further provides a terminal for an idle handoff based on a High Rate Packet Data (HRPD) system, comprising a control module and an HRPD protocol stack, wherein:

the control module is configured to: send an idle handoff instruction to the HRPD protocol stack when the terminal switches from the HRPD system to a non-HRPD radio access technology system;

the HRPD protocol stack is configured to: after receiving the idle handoff instruction, migrate from a non-tunnel state to a tunnel state.

The HRPD protocol stack comprises one or more of the following modules:

an inter-radio access technology idle state protocol module and an inter-radio access technology routing update protocol module.

When the HRPD protocol stack comprises the inter-radio access technology idle state protocol module, the inter-radio access technology idle state protocol module is configured to: after receiving the idle handoff instruction, migrate from a monitor state or a sleep state to the tunnel state;

when the HRPD protocol stack comprises the inter-radio access technology routing update protocol module, the inter-radio access technology routing update protocol module is configured to: after receiving the idle handoff instruction, migrate from an idle state to the tunnel state.

The HRPD protocol stacks further comprises an inter-radio access technology overhead message protocol module;

the inter-radio access technology overhead message protocol module is configured to: after receiving the idle handoff instruction, migrate from an activated state or an unactivated state to a tunnel activated state.

The terminal further comprises an HRPD session management module;

the control module is further configured to: send the idle handoff instruction to the HPRD session management module;

the HRPD session management module is configured to: after receiving the idle handoff instruction, reserve HRPD session information.

The HRPD session management module is further configured to:

send a session maintaining activation message to an access network, set a timer locally, and start up the timer when sending the session maintaining activation message;

if a response message returned by the access network has not been received when the timer is time out, clear the HRPD session information and initialize the HRPD protocol stack.

The HRPD protocol stack further comprises a control channel media access control protocol module;

the inter-radio access technology idle state protocol module is further configured to: after migrating to the tunnel state, send a deactivation command to the control channel media access control protocol module;

the control channel media access control protocol module is configured to: after receiving the deactivation command, migrate from an activated state to an inactivated state.

The HRPD protocol stack further comprises an access channel media access control protocol module;

the inter-radio access technology routing update protocol module is further configured to: after migrating to the tunnel state, send a deactivation command to the access channel media access control protocol module;

the access channel media access control protocol module is configured to: after receiving the deactivation command, migrate from an activated state to an unactivated state.

The control module is further configured to: set a tunnel enabling parameter as a state of tunnel being used;

the inter-radio access technology overhead message protocol module is further configured to: set an overhead parameter update identifier as a state of no update.

The inter-radio access technology routing update protocol module is further configured to: after migrating to the tunnel state, remove all the neighbour information and execute a parameter update operation of neighbour set searching window, stop using a parameter designated in a property override message, and begin to use a parameter designated by a same channel parameter set management property or a different channel parameter set management property.

The HRPD protocol stack further comprises a control channel media access control protocol module and an overhead message protocol module;

the inter-radio access technology idle state protocol module is further configured to: after migrating to the tunnel state, send a deactivation command to the control channel media access control protocol module, and send a tunnel activation command to the overhead message protocol module;

the control channel media access control protocol module is configured to: after receiving the deactivation command, migrate from an activated state to an unactivated state;

the overhead message protocol module is configured to: after receiving the tunnel activation command, migrate from the activated state to the tunnel state.

To sum up, the present invention provides a terminal and method for idle handoff based on the HRPD system, when the terminal is in the handoff area, and the idle handoff occurs from the HRPD system to the non-HRPD radio access technology system (such as LTE system), the terminal after the handoff is in the tunnel state, and the HRPD session information of the terminal can be reserved, thus the HRPD session negotiation no longer needs to be resumed when the terminal switches back to the HRPD system, thereby effectively avoiding the waste of air interface resource and system processing ability and improving the efficiency of the interconnection and intercommunication between the HRPD system and the LTE system or the system using other radio access technology.

BRIEF DESCRIPTION OF DRAWINGS

The illustrative drawings herein are provided to further understand the present invention and constitute a part of the present application, and the illustrative embodiments and the description of the present invention are used to explain the present invention and do not constitute the improper limitation to the present invention.

FIG. 2 is a flow chart of a method for a terminal switching from an HRPD system to a non-HRPD radio access technology system of an embodiment of the present invention;

PREFERRED EMBODIMENTS OF THE PRESENT INVENTION

In the related art, it will produce the following problems during the HRPD-LTE handoff; for example: how to maintain the HRPD session information and protocol stack of the access terminal, and if the HRPD protocol stack of the access terminal are initialized directly to enter network re-selection after the idle handoff of the access terminal, losing of the HRPD session information will be caused. When the HRPD-LTE idle handoff of the terminal occurs, it is indicated that the terminal is in a handoff area, and the terminal may return back to the HRPD area; however, if the protocol stack is initialized directly after the HRPD-LTE idle handoff and no HRPD session information has been reserved, then the HRPD session negotiation must be resumed when the terminal executes the LTE-HRPD idle handoff, which will expend the air interface resources and system processing ability, and cause a low handoff efficiency. Therefore, there is urgent need to define the corresponding mechanism to guarantee the processing of the terminal, so as to improve the efficiency of the interconnection and intercommunication operation.

The present invention provides a terminal and a method for the idle handoff based on the HRPD system, and when the terminal in an idle state switches from the HRPD system to the radio access technology system, the HRPD protocol stack of the terminal migrating from a non-tunnel state to a tunnel state.

Figure 1:
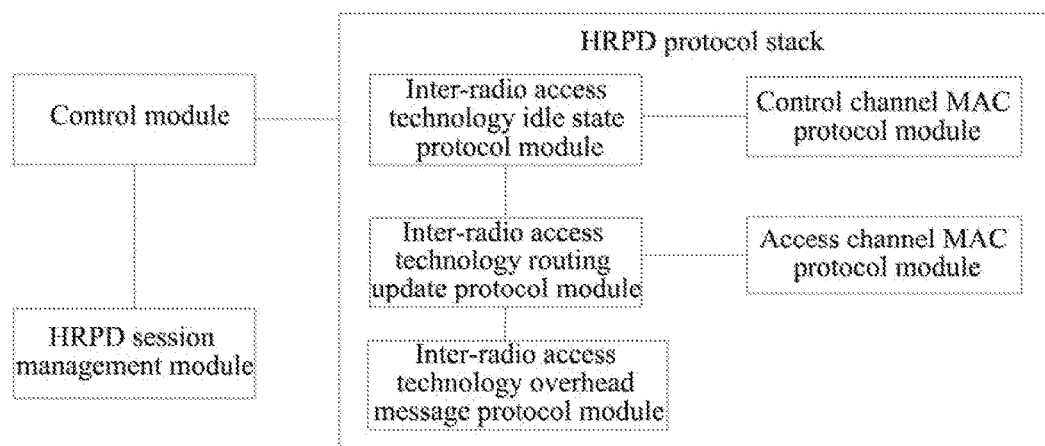
FIG. 1 is a structure diagram of a terminal of an embodiment of the present invention.

The present embodiment provides the terminal for the idle handoff based on the HRPD system, and as shown in FIG. 1, the terminal includes a control module, an HRPD protocol stack and an HRPD session management module;

the HRPD protocol stack can include, but not limit to, one or more of the following protocol modules: an inter-radio access technology idle state protocol module, an inter-radio access technology routing update protocol module, an inter-radio access technology overhead message protocol module, a control channel media access control (MAC) protocol module and an access channel MAC protocol module;

in the present invention, the inter-radio access technology idle state protocol module can be any idle state protocol module supporting the inter-radio access technology interoperation, the inter-radio access technology routing update protocol module can be any routing update protocol module supporting the inter-radio access technology interoperation, and the inter-radio access technology overhead message protocol module can be any overhead message protocol module supporting the inter-radio access technology interoperation.

The control module is configured to send an idle handoff instruction to the HRPD protocol stack when the terminal in the idle state needs to switch from the HRPD system to the non-HRPD radio access technology system;

the HRPD protocol stack is configured to, after receiving the idle handoff instruction, migrate from the non-tunnel state to the tunnel state.

The HRPD protocol stack migrating from the non-tunnel state to the tunnel state refers to that, when the HRPD protocol stack includes the inter-radio access technology idle state protocol module, the inter-radio access technology idle state protocol module migrates from a monitor state or a sleep state to the tunnel state; when the HRPD protocol stack includes the inter-radio access technology routing update protocol module, the inter-radio access technology routing update protocol module migrates from the idle state to the tunnel state; and when the HRPD protocol stack includes the inter-radio access technology overhead message protocol module, the inter-radio access technology overhead message protocol module migrates from an activated state or an unactivated state to the tunnel activated state.

The inter-radio access technology idle state protocol module is also configured to, after migrating to the tunnel state, send a deactivation command to the control channel MAC protocol module;

the control channel MAC protocol module is configured to, after receiving the deactivation command, migrate from the activated state to the unactivated state.

The inter-radio access technology routing update protocol module is also configured to, after migrating to the tunnel state, send the deactivation command to an access channel media access control protocol module;

the access channel MAC protocol module is configured to, after receiving the deactivation command, migrate from the activated state to the unactivated state.

The inter-radio access technology overhead message protocol module is also configured to set an overhead parameter update identifier as a state of no update.

The control module is also configured to set a tunnel enabling parameter to a state of tunnel being used.

The control module is also configured to send the idle handoff instruction to the HRPD session management module.

The HRPD session management module is configured to, after receiving the idle handoff instruction, reserve the HRPD session information.

The HRPD session management module is further configured to send a session maintaining activation message to the access network, set a timer locally, and start up the timer when sending the session maintaining activation message; and is also configured to, if a response message returned by the access network has not been received when the timer is time out, clear the HRPD session massage and initialize the protocol stack.

The inter-radio access technology routing update protocol module is also configured to execute relevant operations in the tunnel state after migrating to the tunnel state, that is, remove all the neighbour information and execute the parameter update operation of neighbour set searching window, stop using the parameter designated in a property override message, and begin to use the parameter designated by a same channel parameter set management property or a different channel parameter set management property.

The present embodiment provides a method for idle handoff based on the HRPD system, as shown in FIG. 2, including the following steps:

step 201: the terminal in the idle state, when switching from the HRPD system to the non-HRPD radio access technology system, sets the tunnel enabling parameter as the state of tunnel being enabled (e.g., setting the tunnel enabling parameter as 1), and sets the overhead parameter update identifier as the state of no update (e.g., setting the overhead parameter update identifier as 0), and the HRPD protocol stack of the terminal migrates from the non-tunnel state to the tunnel state;

the HRPD protocol stack can include, but not limit to, one or more of the following protocol modules: an inter-radio access technology idle state protocol module, an inter-radio access technology routing update protocol module, an inter-radio access technology overhead message protocol module, a control channel MAC protocol module and an access channel MAC protocol module;

in the present invention, the inter-radio access technology idle state protocol module can be any idle state protocol module supporting the inter-radio access technology interoperation, the inter-radio access technology routing update protocol module can be any routing update protocol module supporting the inter-radio access technology interoperation, and the inter-radio access technology overhead message protocol module can be any overhead message protocol module supporting the inter-radio access technology interoperation.

The HRPD protocol stack migrating from the non-tunnel state to the tunnel state refers to that, when the HRPD protocol stack includes the inter-radio access technology idle state protocol module, the inter-radio access technology idle state protocol module migrates from a monitor state or a sleep state to the tunnel state; when the HRPD protocol stack includes the inter-radio access technology routing update protocol module, the inter-radio access technology routing update protocol module migrates from the idle state to the tunnel state; and when the HRPD protocol stack includes the inter-radio access technology overhead message protocol module, the inter-radio access technology overhead message protocol module migrates from an activated state or an unactivated state to the tunnel activated state.

Figure 3:
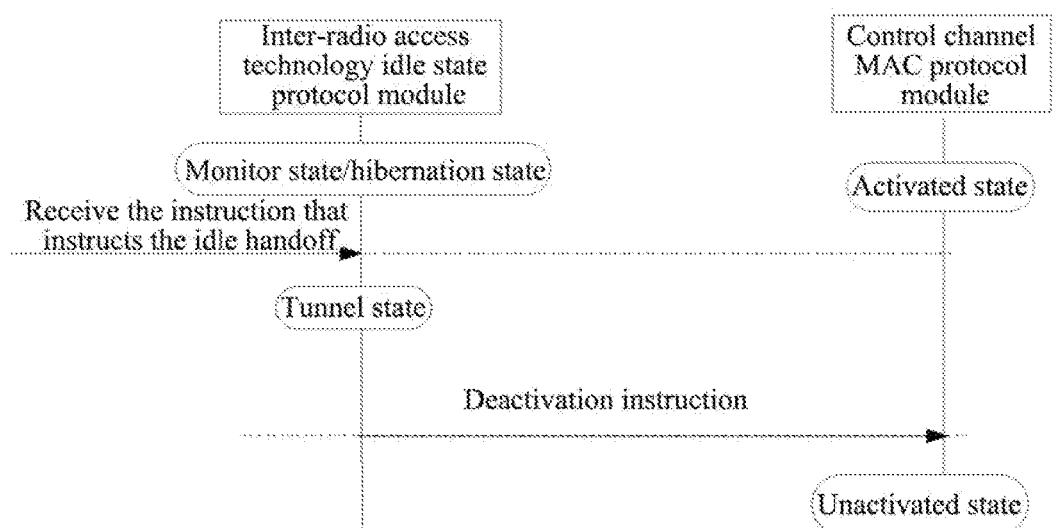
FIG. 3 is a flow chart of processing of an inter-radio access technology idle state protocol module of an access terminal of an HRPD system based on an embodiment of the present invention.
Figure 4:
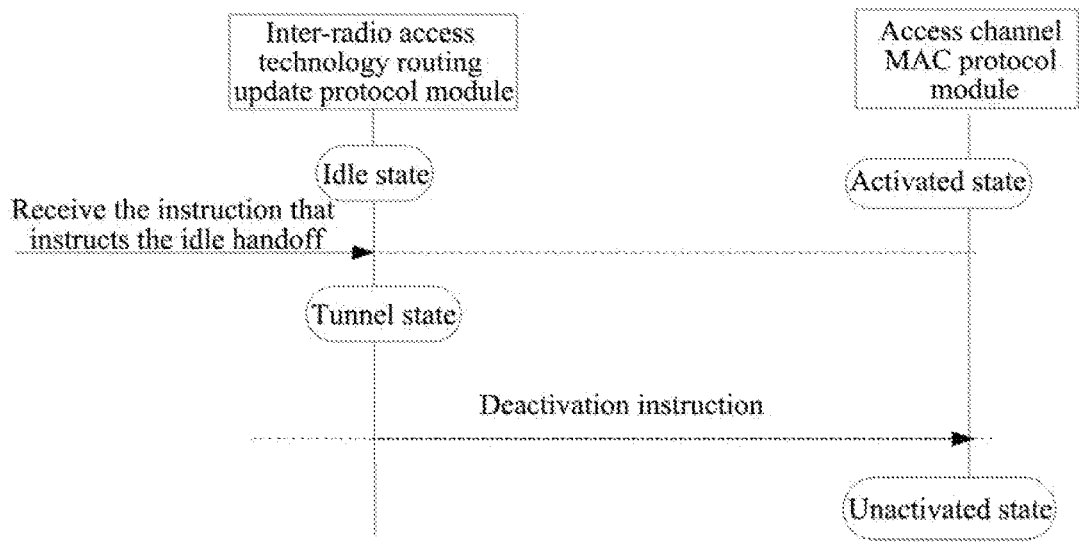
FIG. 4 is a state transition diagram of an inter-radio access technology routing update protocol module of an access terminal of an HRPD system based on an embodiment of the present invention.
Figure 5:
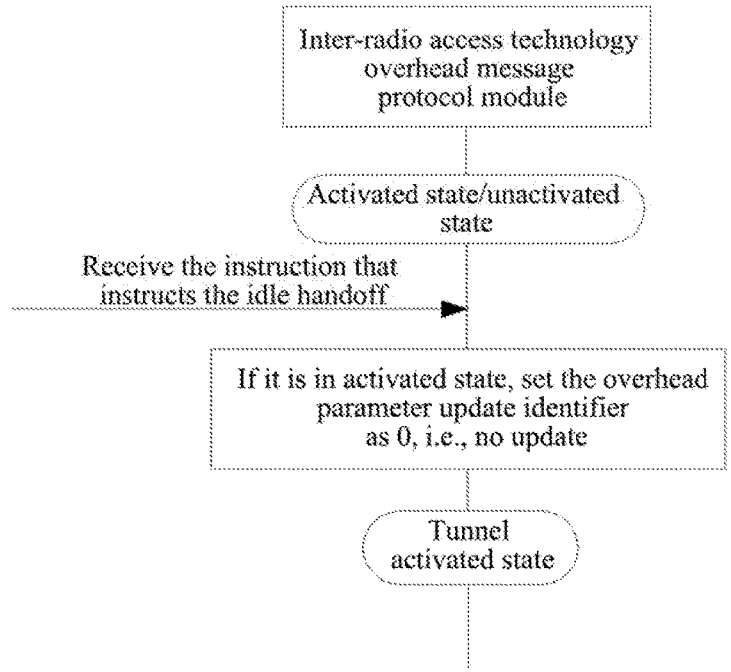
FIG. 5 is a state transition diagram of an inter-radio access technology overhead message protocol module of an access terminal of an HRPD system based on an embodiment of the present invention.

As shown in FIG. 3, it is the schematic diagram of the state transition occurring by the inter-radio access technology idle state protocol module of the terminal of the present invention. As shown in FIG. 4, it is the schematic diagram of the state transition occurring by the inter-radio access technology routing update protocol module of the terminal of the present invention. As shown in FIG. 5, it is the schematic diagram of the state transition occurring by the inter-radio access technology overhead message protocol module of the terminal of the present invention.

Step 202, the terminal reserves the HRPD session information;

further, the terminal can also send the session maintaining activation message to the access network, set a timer locally, and start up the timer when sending the session maintaining activation message; and if the response message returned by the access network has not been received when the timer is time out, the terminal can clear the HRPD session information and initialize the protocol stack.

Figure 6:
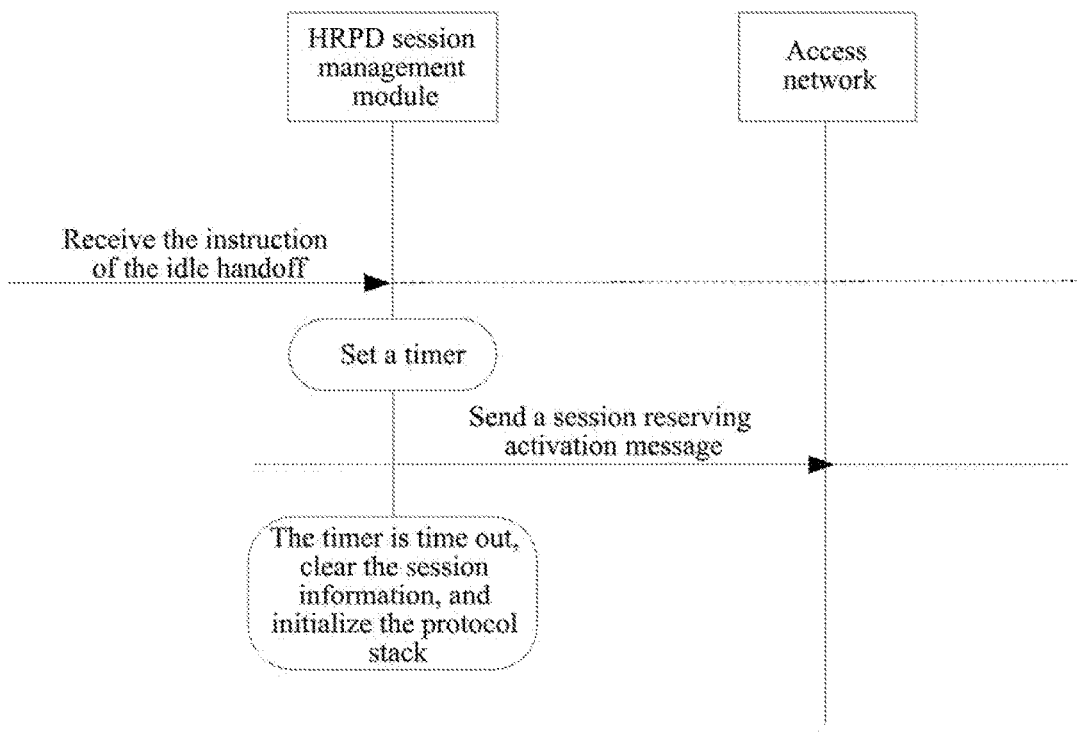
FIG. 6 is a flow chart of processing of an HRPD session management module of an access terminal of an HRPD system based on an embodiment of the present invention.

As shown in FIG. 6, it is a flow chart of the HRPD session management module of the terminal notifying the access network to maintain the HRPD session information of the present invention.

Step 203: the terminal removes all the neighbour information and executes the parameter update operation of neighbour set searching window, stops using the parameter designated in the property override message, and begins to use the parameter value designated by a same channel parameter set management property or a different channel parameter set management property.

Step 204: the inter-radio access technology idle state protocol module, after migrating to the tunnel state, sends a deactivation command to the control channel MAC protocol module; and the control channel MAC protocol module, after receiving the deactivation command, migrates from the activated state to the unactivated state.

Step 205: the inter-radio access technology routing update protocol module, after migrating to the tunnel state, sends the deactivation command to a access channel media access control protocol module; and the access channel MAC protocol module, after receiving the deactivation command, migrates from the activated state to the unactivated state.

The step 204 and step 205 can be executed after the step 201, and the execution order of the step 204 and step 205 is not limited in the present invention.

The present invention also provides another embodiment for the terminal and method for the idle handoff based on the HRPD system, in this embodiment, when the terminal in the idle state switches from the HRPD system to the radio access technology system, the HRPD protocol stack of the terminal migrates from the non-tunnel state to the tunnel state.

Figure 7:
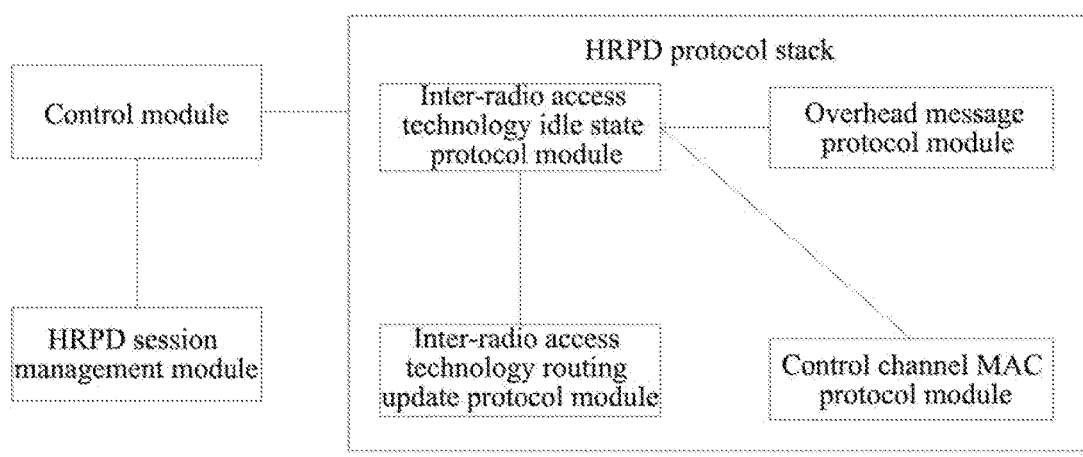
FIG. 7 is a structure diagram of a terminal of another embodiment of the present invention.

The present embodiment provides a terminal for idle handoff based on the HRPD system, and as shown in FIG. 7, the terminal includes a control module, an HRPD protocol stack and an HRPD session management module;

the HRPD protocol stack can include, but not limit to, one or more of the following protocol modules: an inter-radio access technology (Inter-RAT) idle state protocol module, an inter-radio access technology routing update protocol module, a control channel MAC protocol module and an overhead message protocol module;

the control module is configured to send the idle handoff instruction to the HRPD protocol stack when the terminal in the idle state needs to switch from the HRPD system to the HRPD radio access technology system;

the HRPD protocol stack is configured to, after receiving the idle handoff instruction, migrate from the non-tunnel state to the tunnel state.

The HRPD protocol stack migrating from the non-tunnel state to the tunnel state refers to that, when the HRPD protocol stack includes the inter-radio access technology idle state protocol module, the inter-radio access technology idle state protocol module migrates from the monitor state to the tunnel state; when the HRPD protocol stack includes an inter-radio access technology routing update protocol module, the inter-radio access technology routing update protocol module migrates from the idle state to the tunnel state.

The inter-radio access technology idle state protocol module is also configured to, after migrating to the tunnel state, instruct the control channel MAC protocol module and the overhead message protocol module to switch to the other state except for the activated state, that is, send a deactivation command to the control channel MAC protocol module and send a tunnel activation command to the overhead message protocol module;

the control channel MAC protocol module is configured to, after receive the deactivation command, migrate from the activated state to the unactivated state;

the overhead message protocol module is configured to, after receiving the tunnel activation command, migrate from the activated state to the tunnel state;

The control module is also configured to send an idle handoff instruction to the HRPD session management module;

the HRPD session management module is configured to, after receiving the idle handoff instruction, reserve the HRPD session information.

The HPRD session management module is configured to send the session maintaining activation message to the access network, set a timer locally, and start up the timer when sending the session maintaining activation message; and is also configured to, if the response message returned by the access network has not been received when the timer is time out, clear the HPRD session information and initialize the protocol stack.

The inter-radio access technology routing update protocol module is also configured to, after migrating to the tunnel state, execute relevant operations in the tunnel state, that is, remove all the neighbour information and execute the parameter update operation of neighbour set searching window, stop using the parameter designated in the property override message, and begin to use the parameter value designated by a same channel parameter set management property or a different channel parameter set management property.

Figure 8:
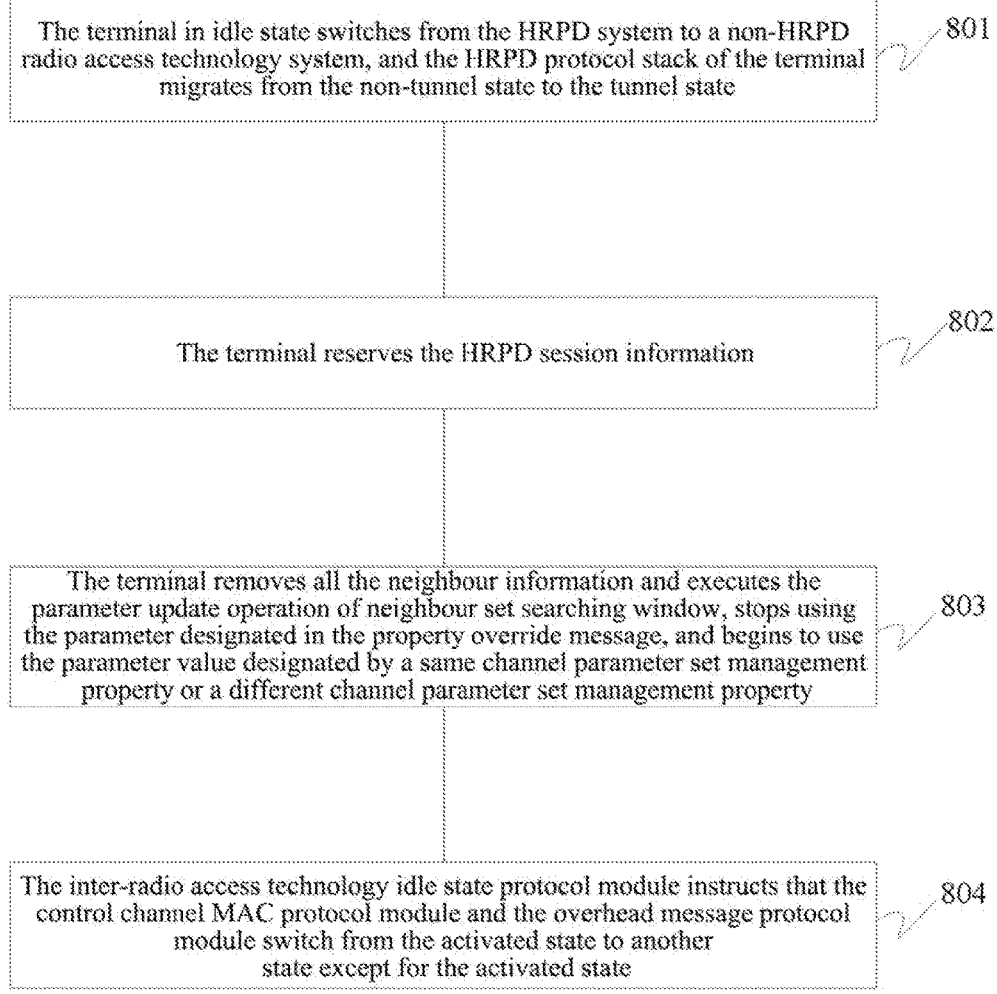
FIG. 8 is a flow chart of a method for a terminal switching from an HRPD system to a non-HRPD radio access technology system of another embodiment of the present invention.

The present embodiment provides a method for the idle handoff based on the HRPD system, and as shown in FIG. 8, the method includes the following steps:

step 801: when the terminal in the idle state needs to switch from the HRPD system to the non-HRPD radio access technology system, the HRPD protocol stack of the terminal migrates from the non-tunnel state to the tunnel state;

the HRPD protocol stack can include, but not limit to, one or more of the following protocol modules: an inter-radio access technology idle state protocol module, an inter-radio access technology routing update protocol module, a control channel MAC protocol module and an overhead message protocol module;

The HRPD protocol stack migrating from the non-tunnel state to the tunnel state refers to that, when the HRPD protocol stack includes the inter-radio access technology idle state protocol module, the inter-radio access technology idle state protocol module migrates from the monitor state to the tunnel state, and when the HRPD protocol stack includes the inter-radio access technology routing update protocol module, the inter-radio access technology routing update protocol module migrates from the idle state to the tunnel state.

Figure 9:
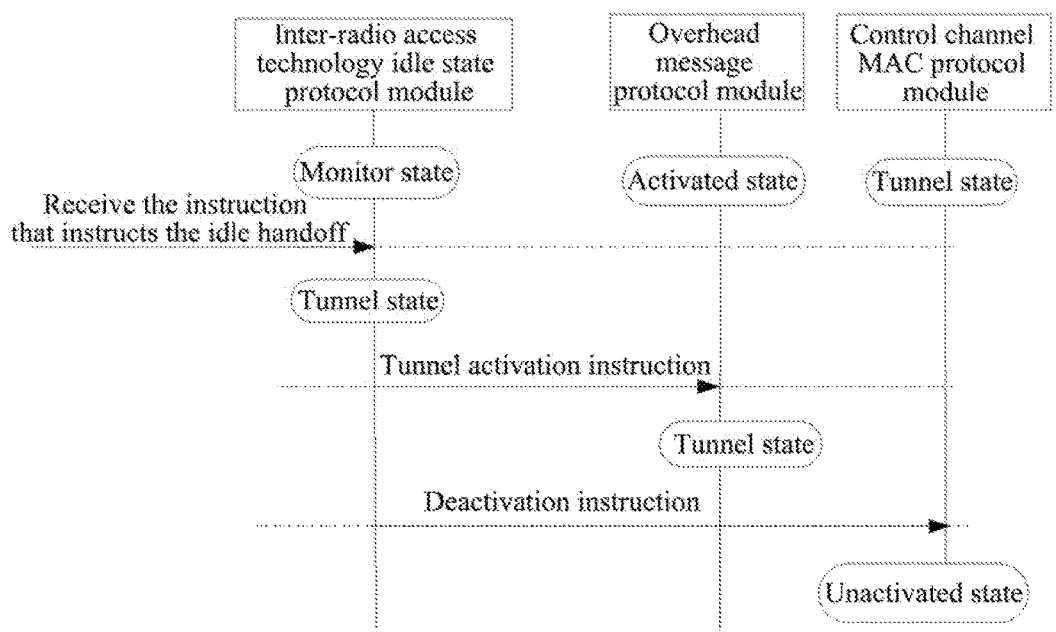
FIG. 9 is a flow chart of processing of an inter-radio access technology idle state protocol module of an access terminal of an HRPD system based on another embodiment of the present invention.

As shown in FIG. 9, it is a schematic diagram of state transition occurring by the inter-radio access technology idle state protocol module of the terminal of the present embodiment.

Figure 10:
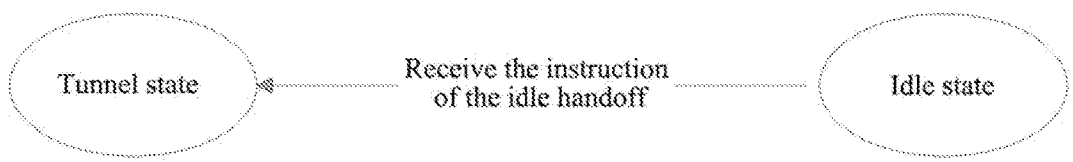
FIG. 10 is a state transition diagram of an inter-radio access technology routing update protocol module of an access terminal of an HRPD system based on another embodiment of the present invention.

As shown in FIG. 10, it is a schematic diagram of state transition after the inter-radio access technology routing update protocol module of the terminal receiving the idle handoff instruction in the present embodiment.

Step 802: the terminal reserves the HRPD session information;

further, the terminal can also send a session maintaining activation message to the access network, set a timer locally, and start up the timer when sending the session maintaining activation message; and if the response message returned by the access network has not been received when the timer is time out, clear the HRPD session information and initialize the protocol stack.

In this embodiment, the flow of the HRPD session management module of the terminal notifying the access network to maintain the HRPD session information is similar to FIG. 6.

Step 803: the terminal removes all the neighbour information and executes the parameter update operation of neighbour set searching window, stops using the parameter designated in the property override message, and begins to use the parameter value designated by a same channel parameter set management property or a different channel parameter set management property.

Step 804: the inter-radio access technology idle state protocol module instructs the control channel MAC protocol module and the overhead message protocol module to switch to the other state except for the activated state.

That is, the inter-radio access technology idle state protocol module sends a deactivation command to the control channel MAC protocol module and sends a tunnel activation command to the overhead message protocol module; the control channel MAC protocol module, after receiving the deactivation command, migrates from the activated state to the unactivated state; and the overhead message protocol module, after receiving the tunnel activation command, migrates from the activated state to the tunnel state.

The schematic diagram of the inter-radio access technology idle state protocol module instructing the control channel MAC protocol module and the overhead message protocol module to have the state transition is shown in FIG. 9.

The step 804 can be executed after the step 801.

The technical scheme of the present invention defines the operation of the idle handoff from the HRPD system to the LTE system or the system using other non-HRPD wireless access technology, thereby effectively avoiding the waste of air interface resource and system processing ability, and improving the efficiency of the interconnection and intercommunication between the HRPD system and the LTE system or the system using other radio access technology.

INDUSTRIAL APPLICABILITY

The present invention provides a terminal and method for idle handoff based on the HRPD system, when the terminal is in the handoff area, and the idle handoff occurs from the HRPD system to the non-HRPD radio access technology system (such as LTE system), the terminal after the handoff is in the tunnel state, and the HRPD session information of the terminal can be reserved, thus it is not necessary to perform the HRPD session negotiation again when the terminal switches back to the HRPD system, thereby effectively avoiding the waste of air interface resources and system processing capabilities and improving the efficiency of the interconnection and intercommunication between the HRPD system and the LTE system or the system using other radio access technology.

What we claim is:

1. A method for an idle handoff from a High Rate Packet Data (HRPD) system to a non-HRPD radio access technology system, comprising:

when a terminal being in an idle state switches from the HRPD system to the non-HRPD radio access technology system, the terminal that is in the idle state maintaining HRPD session information and an HRPD protocol stack of the terminal, and the HRPD session information of the terminal is reserved after the terminal's handoff to the non-HRPD radio access technology system, thereby HRPD session negotiation is not required when the terminal switches back to the HRPD system;

the terminal sending a session maintaining activation message to an access network, setting a timer locally, and the terminal starting up the timer when sending the session maintaining activation message;

under a situation that a response message from the access network has not been received when the timer is time out, the terminal clearing the HPRD session information and initializing the HRPD protocol stack;

wherein the terminal that is in the idle state maintaining the HRPD protocol stack comprises the HRPD protocol stack migrating from a non-tunnel state to a tunnel state within the terminal that is in the idle state;

the HRPD protocol stack comprises following modules: an inter-radio access technology idle state protocol module, an inter-radio access technology routing update protocol module, and an inter-radio access technology overhead message protocol module;

the step of the HRPD protocol stack migrating from the non-tunnel state to the tunnel state comprises:

when the HRPD protocol stack comprises the inter-radio access technology idle state protocol module, the inter-radio access technology idle state protocol module migrating from a monitor state of the idle state or a sleep state of the idle state to the tunnel state within the terminal that is in the idle state;

when the HRPD protocol stack comprises an inter-radio access technology routing update protocol module, the inter-radio access technology routing update protocol module migrating from the idle state to the tunnel state within the terminal that is in the idle state;

when the HRPD protocol stack comprises the inter-radio access technology overhead message protocol module, after receiving an idle handoff instruction, the inter-radio access technology overhead message protocol module migrating from an activated state or an inactivated state to a tunnel activated state and setting an overhead parameter update identifier to be a state of no update.

2. The method according to claim 1, wherein, the HRPD protocol stack further comprises a control channel media access control protocol module; and when the HRPD protocol stack comprises the inter-radio access technology idle state protocol module, after the step of the inter-radio access technology idle state protocol module migrating to the tunnel state, the method further comprises:

sending a deactivation command to the control channel media access control protocol module;

the control channel media access control protocol module, after receiving the deactivation command, migrating from an activated state to an inactivated state.

3. The method according to claim 1, further comprising: the terminal that is in the idle state setting a tunnel enabling parameter as a state of tunnel being used.

4. The method according to claim 1, wherein, the HRPD protocol stack further comprises a control channel media access control protocol module and an overhead message protocol module; and after the step of the inter-radio access technology idle state protocol module migrating to the tunnel state, the method further comprises:

sending a deactivation command to the control channel media access control protocol module, and sending a tunnel activation command to the overhead message protocol module;

the control channel media access control protocol module, after receiving the deactivation command, migrating from an activated state to an inactivated state; and the overhead message protocol module, after receiving the tunnel activation command, migrating from the activated state to the tunnel state.

5. A terminal for an idle handoff from a High Rate Packet Data (HRPD) system to a non-HRPD radio access technology system, comprising a hardware processor configured to execute steps of a control module, an HRPD protocol stack and an HRPD session management module, wherein:

the control module is configured to: send an idle handoff instruction to the HRPD protocol stack and the HPRD session management module to maintain the HRPD protocol stack and HRPD session information, when the terminal being in an idle state switches from the HRPD system to a non-HRPD radio access technology system; wherein the HRPD session information of the terminal is reserved after the terminal's handoff to the non-HRPD radio access technology system, thereby HRPD session negotiation is not required when the terminal switches back to the HRPD system;

the HRPD protocol stack is configured to: after receiving the idle handoff instruction, migrate from a non-tunnel state to a tunnel state within the terminal that is in the idle state;

the HRPD session management module is configured to: after receiving the idle handoff instruction, maintain the HRPD session information; send a session maintaining activation message to an access network, set a timer locally, and start up the timer when sending the session maintaining activation message; and under a situation that a response message from the access network has not been received when the timer is time out, clear the HPRD session information and initialize the HRPD protocol stack;

the HRPD protocol stack comprises the following modules:

an inter-radio access technology idle state protocol module, an inter-radio access technology routing update protocol module, and an inter-radio access technology overhead message protocol module;

when the HRPD protocol stack comprises the inter-radio access technology idle state protocol module, the inter-radio access technology idle state protocol module is configured to: after receiving the idle handoff instruction, migrate from a monitor state of the idle state or a sleep state of the idle state to the tunnel state within the terminal that is in the idle state;

when the HRPD protocol stack comprises the inter-radio access technology routing update protocol module, the inter-radio access technology routing update protocol module is configured to: after receiving the idle handoff instruction, migrate from the idle state to the tunnel state within the terminal that is in the idle state;

when the HRPD protocol stack comprises the inter-radio access technology overhead message protocol module, the inter-radio access technology overhead message protocol module is configured to: after receiving the idle handoff instruction, migrate from an activated state or an inactivated state to a tunnel activated state, and set an overhead parameter update identifier to be a state of no update.

6. The terminal according to claim 5, wherein,
the HRPD protocol stack further comprises a control channel media access control protocol module;
the inter-radio access technology idle state protocol module is further configured to: after migrating to the tunnel state, send a deactivation command to the control channel media access control protocol module;
the control channel media access control protocol module is configured to: after receiving the deactivation command, migrate from an activated state to an inactivated state.

7. The terminal according to claim 5, wherein,
the control module is further configured to: set a tunnel enabling parameter as a state of tunnel being used.

8. The terminal according to claim 5, wherein,
the HRPD protocol stack further comprises a control channel media access control protocol module and an overhead message protocol module; and
the inter-radio access technology idle state protocol module is further configured to: after migrating to the tunnel state, send a deactivation command to the control channel media access control protocol module, and send a tunnel activation command to the overhead message protocol module;
the control channel media access control protocol module is configured to: after receiving the deactivation command, migrate from an activated state to an inactivated state;
the overhead message protocol module is configured to: after receiving the tunnel activation command, migrate from the activated state to the tunnel state.

* * * * *